US009311133B1

(12) United States Patent
Nataraja et al.

(10) Patent No.: US 9,311,133 B1
(45) Date of Patent: Apr. 12, 2016

(54) TOUCHLESS MULTI-DOMAIN VLAN BASED ORCHESTRATION IN A NETWORK ENVIRONMENT

(71) Applicant: CISCO TECHNOLOGY, INC., San Jose, CA (US)

(72) Inventors: Rajesh Babu Nataraja, Sunnyvale, CA (US); Shyam Kapadia, San Jose, CA (US); Nilesh Shah, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/510,930

(22) Filed: Oct. 9, 2014

(51) Int. Cl.
*G06F 9/46* (2006.01)
*G06F 9/455* (2006.01)
*H04L 12/46* (2006.01)
*H04L 12/931* (2013.01)

(52) U.S. Cl.
CPC ........ *G06F 9/45558* (2013.01); *H04L 12/4641* (2013.01); *H04L 49/70* (2013.01); *G06F 2009/45595* (2013.01)

(58) Field of Classification Search
CPC .................................................. G06F 9/45558
USPC ................................................ 718/101–108
See application file for complete search history.

(56) References Cited

U.S. PATENT DOCUMENTS

| 7,987,506 | B1 * | 7/2011 | Khalid | ................ | H04L 12/4633 370/401 |
| 8,429,276 | B1 * | 4/2013 | Kumar | .................. | G06F 9/5077 709/226 |
| 8,718,071 | B2 | 5/2014 | Li et al. | | |
| 2003/0126202 | A1 * | 7/2003 | Watt | ...................... | G06F 9/4401 709/203 |
| 2006/0114842 | A1 * | 6/2006 | Miyamoto | .......... | H04L 12/1886 370/255 |
| 2009/0175591 | A1 * | 7/2009 | Gondhalekar | ... | H04N 21/23617 386/291 |
| 2010/0208615 | A1 * | 8/2010 | Soon | ..................... | H04L 12/462 370/254 |
| 2014/0006584 | A1 | 1/2014 | Dunbar et al. | | |
| 2014/0250220 | A1 * | 9/2014 | Kapadia | .............. | H04L 12/4625 709/224 |

OTHER PUBLICATIONS

Recio, R., & Cardona, O. (2009). Automated Ethernet Virtual Bridging. In First Workshop on Data Center Converged and Virtual Ethernet Switching (DC-CAVES) (pp. 11).*
Woodward, S. L., et al. "A high-degree photonic cross-connect for transparent networking, flexible provisioning & capacity growth." Proc. European Conf. Optical Communications. 2006, pp. 1-2.*
Manzalini, Antonio, et al. "Clouds of virtual machines in edge networks." Communications Magazine, IEEE 51.7 (2013): pp. 63-70.*

(Continued)

*Primary Examiner* — Satish Rampuria
(74) *Attorney, Agent, or Firm* — Patent Capital Group

(57) ABSTRACT

An example method for touchless multi-domain VLAN based orchestration in a network environment is provided and includes receiving mobility domain information for a virtual machine associated with a processor executing the method in a network environment, the mobility domain information comprising a mobility domain identifier (ID) indicating a scope within which the virtual machine can be moved between servers, generating a virtual station interface (VSI) discovery protocol (VDP) message in a type-length-value (TLV) format with the mobility domain information, and transmitting the VDP message to a leaf switch directly attached to the server, wherein the leaf switch provisions a port according to the mobility domain information.

20 Claims, 6 Drawing Sheets

(56) References Cited

OTHER PUBLICATIONS

Cisco Configuration Guide, Cisco Nexus 1000V VDP Configuration Guide, Release 4.2(1)SV2(2.2), Cisco Systems, Inc., Jan. 29, 2013; 24 pages.

Kamath, et al., "Edge Virtual Bridge Proposal Version 0, Rev. 0.1," Editors: Hewlett-Packard Corp., IBM; Apr. 23, 2010, 72 pages.

Nakagawa, et al., Automated Migration of Port Profile for Multi-Level Switches, Proceeding, DC-CaVES '11 Proceedings of the $3^{rd}$ Workshop on Data Center—Converged and Virtual Ethernet Switching, pp. 22-29, San Francisco, CA, Sep. 6-8, 2011.

* cited by examiner

TOUCHLESS MULTI-DOMAIN VLAN BASED ORCHESTRATION IN A NETWORK ENVIRONMENT

TECHNICAL FIELD

This disclosure relates in general to the field of communications and, more particularly, to touchless multi-domain virtual local area network (VLAN) based orchestration in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method executed by a hardware processor of a server for touchless multi-domain VLAN based orchestration in a network environment is provided and includes receiving mobility domain information (e.g., information sufficient to identify a specific mobility domain) for a virtual machine associated with the processor, the mobility domain information comprising a mobility domain identifier (ID) indicating a scope within which the virtual machine can be moved between servers, generating a virtual station interface (VSI) discovery protocol (VDP) message in a type-length-value (TLV) format with the mobility domain information, and transmitting the VDP message to a leaf switch directly attached to the server, wherein the leaf switch provisions a port according to the mobility domain information.

As used herein, the term "virtual machine" encompasses an emulation of a computer system, operating based on the computer architecture and functions of a real or hypothetical computer, with particular implementations involving specialized hardware, software, or a combination of both. The virtual machine may execute in a hypervisor of a server (e.g., blade server, rack server, stand-alone server) using the server's hardware (e.g., processor and memory element).

Example Embodiments

Figure 1:
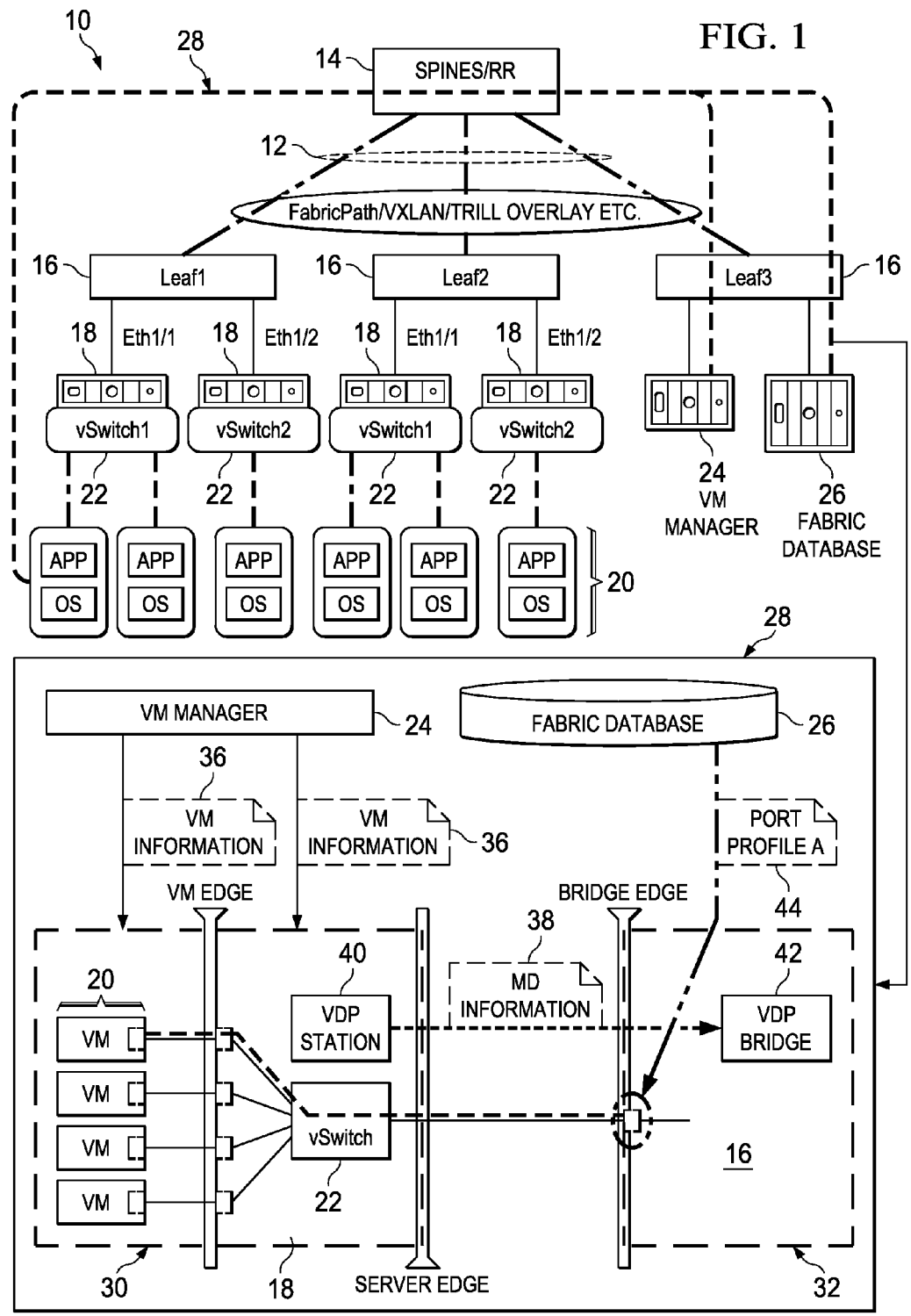
FIG. 1 is a simplified block diagram illustrating a communication system for touchless multi-domain VLAN based orchestration in a network environment.

Turning to FIG. 1, FIG. 1 is a simplified block diagram illustrating a communication system 10 for touchless multi-domain VLAN based orchestration in a network environment in accordance with one example embodiment. FIG. 1 illustrates a network 12 (generally indicated by an arrow) comprising a plurality of switches, for example, one (or more) spine switch(es) 14, and several leaf switches 16. Spine switch(es) 14 and leaf switches 16 may comprise identical or similar network elements, and may differ merely in the nature of devices attached to their respective ports: whereas spine switch(es) 14 connect with leaf switches 16 on their respective ports, a plurality of servers 18 may be connected to leaf switches 16 on their respective ports.

Each server 18 may host one or more virtual machines (VMs) 20, which may be owned or operated by separate tenants. Each server 18 may be configured with a virtual switch (vSwitch) 22 that forms part of a distributed virtual switch across network 12. vSwitch 22 enables VMs 20 to connect to network 12 through suitable overlay network architectures, such as FabricPath, virtual Extensible Local Area Network (VXLAN), Transparent Interconnection of Lots of Links (TRILL) overlay, etc. Each vSwitch 22 comprises part of a mobility domain; each mobility domain can include more than one vSwitch 22; however, any one vSwitch 22 cannot be part of more than one mobility domain.

As used herein, the term "mobility domain" comprises a scope (e.g., logical abstraction) within which a VM (e.g., 20) can be moved (e.g., a specific VM can be moved from one server to another within the same mobility domain; the VM cannot be moved between two distinct mobility domains) and under which virtual port groups, port identifiers and/or port profiles have significance. Information sufficient to identify a specific mobility domain (MD) can include an identifier for a set of virtual local area networks (VLANs); the identifier may comprise any suitable numeral or letter, or combination thereof within which the set of VLANs are scoped. Note that in various embodiments, the mobility domain may comprise configuration of vSwitch 22; in other embodiments, the mobility domain may comprise a domain of VM manager 24 (e.g., VMWARE® vCenter™, OpenStack™ controller); in yet other embodiments, the mobility domain may comprise the universally unique identifier (UUID). Furthermore, any one VLAN can span multiple mobility domains; and each mobility domain in the network may include more than one VLAN.

The VLAN comprises a network segment that encompasses a distinct broadcast domain in a Layer 2 network; different VLANs are mutually isolated so that packets can only pass between them via one or more routers, on a Layer 3 (or higher) protocol (Layer 2 and Layer 3 refer to network layers in the Open Systems Interconnect (OSI) Network Model). Note that the VLAN is similar to a physical local area network (LAN); it differs in allowing end stations to be grouped together more easily even if they are not on the same network switch. VLAN membership can be configured through software instead of physically relocating devices or connections. To physically replicate the functions of a VLAN would require a separate, parallel collection of network cables and equipment separate from the primary network. From an implementation point of view, separating ports on a switch (e.g., leaf switch 16) by VLAN groups separates traffic from various devices in a manner similar to connecting the devices to another, distinct switch of their own (associated with the separate port groupings).

A central VM manager 24 enables configuration of VMs 20 for connectivity in network 12. A fabric database 26 may include information pertaining to configuration of ports (e.g., at leaf switches 16) according to mobility domains and VLANs. For example, fabric database 26 can include port profiles; each {mobility domain, VLAN} combination corresponding to a distinct port profile. When a leaf switch port is configured according to the port profile, it accepts packets belonging to the corresponding {mobility domain, VLAN} combination at the port and performs actions (e.g., forward, drop, etc.) on such packets according to policies of the port profile.

VM Manager 24 and fabric database 26 may communicate with VMs 20 and leaf switches 16 to enable automatic port configuration of VLANs and mobility domains at leaf switches 16. An example configuration communication 28 (shown in dotted lines) may be illustrated in greater detail as follows. A logical VM edge 30 at VMs 20 provisions and enforces some connectivity settings (e.g., VLANs, bandwidth, etc.) at VMs 20; a logical bridge edge 32 provisions and enforces policies to coordinate server connection settings at leaf switch 16. VM manager 24 pushes VM information 36 to server 18. VM information 36 includes mobility domain (MD) information 38 (which includes the mobility domain identifier and VLAN identifier) for VMs 20 in server 18.

A virtual station interface discovery protocol (VDP) station 40 executing at vSwitch 22 in server 18 may extract MD information 38 from VM information 26 and send MD information 38 to a corresponding VDP bridge 42 executing in leaf switch 16. VDP bridge 42 may forward MD information 38 to appropriate modules in leaf switch 16, which may query fabric database 26 for a port profile 44 associated with the mobility domain identifier and VLAN identifier specified in MD information 38. Fabric database 26 may return port profile 42 (e.g., port profile A) associated with the {mobility domain, VLAN} combination queried by leaf switch 16. Leaf switch 16 may configure the relevant port according to port profile 42.

Note that the number of switches, servers, virtual machines, tenants, VLANs and other elements of communication system 10 shown in the FIGURE is merely for ease of illustration, and is not intended to be limiting in any sense. Any number of such and other elements may be included within communication system 10 within the broad scope of the embodiments.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Cisco® Vinci™, also known as Dynamic Fabric Automation (DFA) is a network architecture that can meet performance demands of massively scaled data centers (MSDCs). Vinci's physical topology is based on a two-tier fat tree, also called Clos network, where each leaf switch or router connects to each spine switch or router and vice versa. In Vinci, border gateway protocol (BGP) is employed to support host route distribution among leafs, via route reflector. To support data forwarding, two overlay schemes, FabricPath and virtual extensible local area network (VXLAN), can be used.

DFA also supports multi-tenancy. Multi-tenancy refers to an architecture in which a single instance of a software application serves multiple customers. Each customer is called a 'tenant.' Tenants can comprise organizations, individuals, associations, etc. Tenants may be given the ability to customize some parts of the application, such as color of the user interface or business rules. For example, a software-as-a-service (SaaS) provider can run one instance of an application on one instance of a database and provide web access to multiple tenants; each tenant's data is isolated and remains invisible to other tenants. In the multi-tenant architecture, the software application is designed to virtually partition its data and configuration, and each tenant works with a customized virtual application.

DFA offers scale and multi-tenancy with simplicity of orchestration. To facilitate a simpler network orchestration of tenant networks, the DFA architecture separates underlay network management thereby decoupling it from overlay network orchestration by offering a tie into various VM orchestrators offered in the industry. An aspect of orchestration scale includes agile orchestration, where network resources are instantiated on-demand and reclaimed after use. To dynamically instantiate the network, a typical method is to have the vSwitch (within hypervisor) indicate the presence of a network to the upstream network device (e.g., leaf switch), typically through VDP messages.

VDP is an Institute of Electrical and Electronics Engineers (IEEE®) standard developed to communicate the presence of virtual machines and their interface information reliably to the network. VDP is part of Edge Virtual Bridging (EVB; 802.1Qbg) standards addressing numerous networking-related challenges introduced by server virtualization. VDP deployment involves two components: (1) VDP-Station, which resides in the server's hypervisor or vSwitch and has direct knowledge of the VMs hosted thereon; (2) VDP-Bridge, which is an implementation of the VDP in a bridge that is connected to the leaf switch, interprets the VDP Station messages and provides resources in the bridge for handling the VM's network needs. The VDP bridge can include multiple ports facing different VDP stations, where each port communicates independently with its corresponding VDP station.

The VDP station (at the server) can inform the adjacent VDP Bridge (at the leaf switch) before a VM is deployed (e.g., started or moved), including the VLAN the VM needs and the Media Access Control (MAC) address (or set of MAC addresses) the VM uses. VDP uses a two-step configuration process: (1) pre-associate phase, where the VDP station informs the leaf switch about its future needs, for example, to book resources (e.g., VLANs) on the leaf switch in advance of the VM deployment; and (2) associate phase, when the VDP station activates an association between a Virtual Station Interface (VSI) instance (e.g., virtual network interface card at the VM) and a leaf switch port. In addition to detecting the MAC and IP addresses of the end-host VMs when a server is activated in the network, or during VM mobility events, VDP also triggers auto-configuration of leaf switches on the DFA architecture for further VM traffic.

VDP provides various features, for example, facilitates end-to-end segmentation enabled in the DFA architecture and removes disadvantages of the host-based overlays; serves as an end-host registration protocol for leaf switches that use the registration information to automatically configure network information; uses Edge Control Protocol (ECP, also part of the IEEE 802.1Qbg standard) as the transport protocol for the protocol data units (PDUs); facilitates constant migration of VMs and their corresponding network states by enabling association and de-association of VSI instances; enables segmentation through native encapsulation and other DFA-based configuration between the leaf switches and vSwitches; etc. Note that VDP associates the VSI with its virtually or physically attached bridge port; although the standard assumes the use of a virtual VDP station, the protocol is actually agnostic as to whether the station is virtually or physically instantiated.

In the DFA implementation of VDP, when the VM is instantiated, the VDP station registers its presence with the VDP Bridge and passes relevant network information to the DFA leaf switch using VDP. The network information for the VM is carried in appropriate Type Length Value (TLV) format. The TLV includes a Cisco Organizationally Unique Identifier (OUI) TLV filter format that indicates the network information parameters (e.g., Internet Protocol (IP) address, VM name) for the VM. The DFA leaf switch retrieves and applies the corresponding port profile to the VM to provide an automatic provisioning mechanism for reachability and network control. The leaf switch automatically configures and attaches a VLAN value to the segment ID, and informs the VDP station about the new VLAN. The vSwitch at the VM applies the VLAN in an IEEE 802.1Q encapsulation of packets for that VM. After the VM is successfully associated, the VDP station periodically sends network information to the leaf switch for a state refresh.

VDP also offers an option (e.g., filter) to carry the VLAN of interest to the leaf switch thereby allowing the leaf switch to allocate resources associated with that VLAN. In large scale multi-tenant environments, different tenants may demand the same VLAN. Consequently, some context is required within which the requested VLAN can be scoped, to avoid security problems with assigning the same VLAN to different tenants. DFA provides a mobility domain ID that represents a logical entity to scope a set of 4 k VLANs. However, the individual ports at the leaf switches connected to servers should be configured with the correct mobility domain ID so that VLAN requests coming into the ports can be appropriately scoped and associated with the respective requesting tenants. This is a tedious, time-consuming, and error-prone task as increasing number of servers are added to the network. For example, a server belonging to a given VMware® vCenter™ instance (vCenter is a software application managing a network), when connected to a leaf switch port must be associated with the corresponding mapped mobility domain ID; otherwise, the resulting misconfiguration could inter-mingle multiple tenants' traffic with each other causing a serious security risk.

A method to isolate such multi-tenant traffic requires the leaf switch to communicate with different vCenter instances, each of which can manage 4 k VLANs. On a given leaf switch, a VLAN can be assigned only to one tenant and there can be no overlapping VLANs on the same leaf switch. However, such a requirement can limit the mobility of tenant workloads in a large data center. Moreover, such an approach that requires every leaf switch to communicate with an orchestrator or VM manager cannot scale suitably.

Communication system 10 is configured to address these issues (and others) in offering a system and method for touchless multi-domain VLAN based orchestration in a network environment. The methods described herein may be executed by respective hardware processors of servers 18 in network 12. For example, the methods may be executed by VDP station 40 executing in server 18, using server 18's hardware processor. VDP station 40 may receive mobility domain information 38 for a specific VM 20 (associated with the processor/server 18), mobility domain information 38 comprising a mobility domain ID indicating a scope within which VM 20 can be moved between servers 18. VDP station 40 may generate a VDP message in a type-length-value (TLV) format with mobility domain information 40, and transmit the VDP message to directly attached leaf switch 16. In many embodiments, the TLV format of the VDP message includes a sub-type indicating that the VDP message includes the mobility domain information, a mobility domain length indicating a length of the mobility domain ID, and a value indicating the mobility domain ID. The VDP message may also include a VSI manager ID TLV definition with a mobility domain organizationally unique identifier (OUI). The VDP message can comprise a VDP Associate Request (according to IEEE 802.1 qbg D2.2 specifications). In some embodiments, VDP station 40 may transmit periodic Keep Alive messages to leaf switch 16 including the mobility domain ID.

Leaf switch 16 provisions a port therein according to mobility domain information 30. In some embodiments, mobility domain information 38 further comprises VLAN information (e.g., VLAN ID, VLAN name, etc.) of VM 20. In some embodiments, mobility domain ID may comprise a universally unique identifier (UUID) of vSwitch 22. Leaf switch 18 may query fabric database 26 to obtain port profile 44 indexed at fabric database 26 according to a {mobility domain ID, VLAN} combination, and leaf switch 18 may provision the port according to port profile 44.

Note that mobility domain information 38 is received at server 18 from a central management application, such as VM Manager 24. Thus, it is not configured in individual servers 18, or leaf switches 16. A single configuration action including configuration of substantially all VMs 20 in network 12 with the appropriate mobility domain and VLAN information can be propagated through network 12 to substantially all instances of vSwitch 22 executing in respective hypervisors of corresponding servers 18. Thereafter, VDP station 40, and VDP Bridge 42 may co-ordinate to enable automatic port configuration at leaf switch 16 without manual intervention.

Embodiments of communication system 10 provide for specific VDP extensions to enable seamless VDP-VLAN based auto-configuration; leaf switches 16 may auto-configure ports with the mobility domain and VLAN configuration of attached VMs without any manual intervention, potentially allowing for simplicity in deployment and eliminating operator error. In various embodiments, when VM 24 is instantiated, VDP station 40 communicates MD information 38 associated with VM 24 to VDP bridge 42 through a VDP associate request. The VDP associate request packet can include: VSI Manager ID; VSI ID (e.g., a unique identifier for each of the vNICs associated with the VM; each VSI ID uniquely maps to the VM's vNIC); filter information (e.g., comprising VM information 36, for example, according to IEEE 802.1qbg D2.2). The filter information can include MD information 38, comprising the mobility ID and VLAN.

In various embodiments, VDP-Station 40 includes the mobility domain identifier in the VDP associate message it sends out to VDP Bridge 42. The mobility domain ID may also be included in the periodic 'keep alive' messages from VDP Station 40. When VDP Bridge 42 receives the new associate request, it extracts the mobility domain ID and the VLAN and provides it to the appropriate module in leaf switch 16 for provisioning the fabric network information.

In various embodiments, VDP Station 40 and VDP Bridge 42 extend the VDP TLVs to include the mobility domain ID of VMs 24. VDP Bridge 42 uses the mobility domain ID from the VDP packet instead of requiring the administrator to configure the mobility domain on each port of leaf switches 16. For example, the mobility domain ID of VMs 24 identified by VDP Bridge 42 may be communicated from leaf switch 16 to fabric database 26. Fabric database 26 may store port profiles 44 indexed by mobility domain ID and VLAN combinations. In response to the query from leaf switch with the mobility domain ID and VLAN information (obtained by VDP Bridge 42 from MD information 38), fabric database 26 may return relevant port profile 44 (e.g., port profile A). Note that port profile 44 includes properties and settings to configure virtual interfaces in leaf switch 16 hardware. In some embodiments, port profiles 44 may be created and administered by a centralized manager application; however, there is no clear visibility into the properties of any specific port profile (e.g., port profile A) from VM Manager 24.

Such a mechanism can greatly simplify the administrator's task, for example, by eliminating the need for coordinating with server administrators to identify the connecting server's mobility domain. Instead of configuring a number of ports on individual leaf switches 16 with the mobility domain, administrators only have to configure vSwitch 22 with the mobility domain ID, for example, using a centralized control or VM manager 24. Such configuration can further be avoided in some embodiments that utilize the vSwitch's UUID or a VM orchestrator ID as the mobility domain ID.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, fabric database 26 can comprise a standalone server or a local configuration storage in leaf-switches 16 that maps each server 18 to its predefined port profile, which can include VLAN, ACL and/or QoS settings. Leaf switches 16 and spine switches 14 comprise hardware switches configured to forward packets in a network environment. vSwitch 22 comprises a distributed virtual switch (DVS) with separate instances on each hypervisor of servers 18 in network 12. Each instance of vSwitch 22 may comprise virtual Ethernet Modules (VEMs), virtual ports, and other virtual switch components instantiated and executing in servers 18 and may perform Layer 2 switching and advanced networking functions, such as applying quality of service (QoS) settings, access control lists, etc. on inbound and outbound traffic. In various embodiments, vM Manager 24 comprises an application, such as VMWare vCenter or Microsoft System Center Virtual Machine Manager (SCVMM) executing in a suitable server or other network element in network 12. In various embodiments, VM Manager 24 enables configuring and managing virtualization hosts, networking, and storage resources in a virtualized data center environment, for example, to create and deploy virtual machines and services to private clouds.

Figure 2:
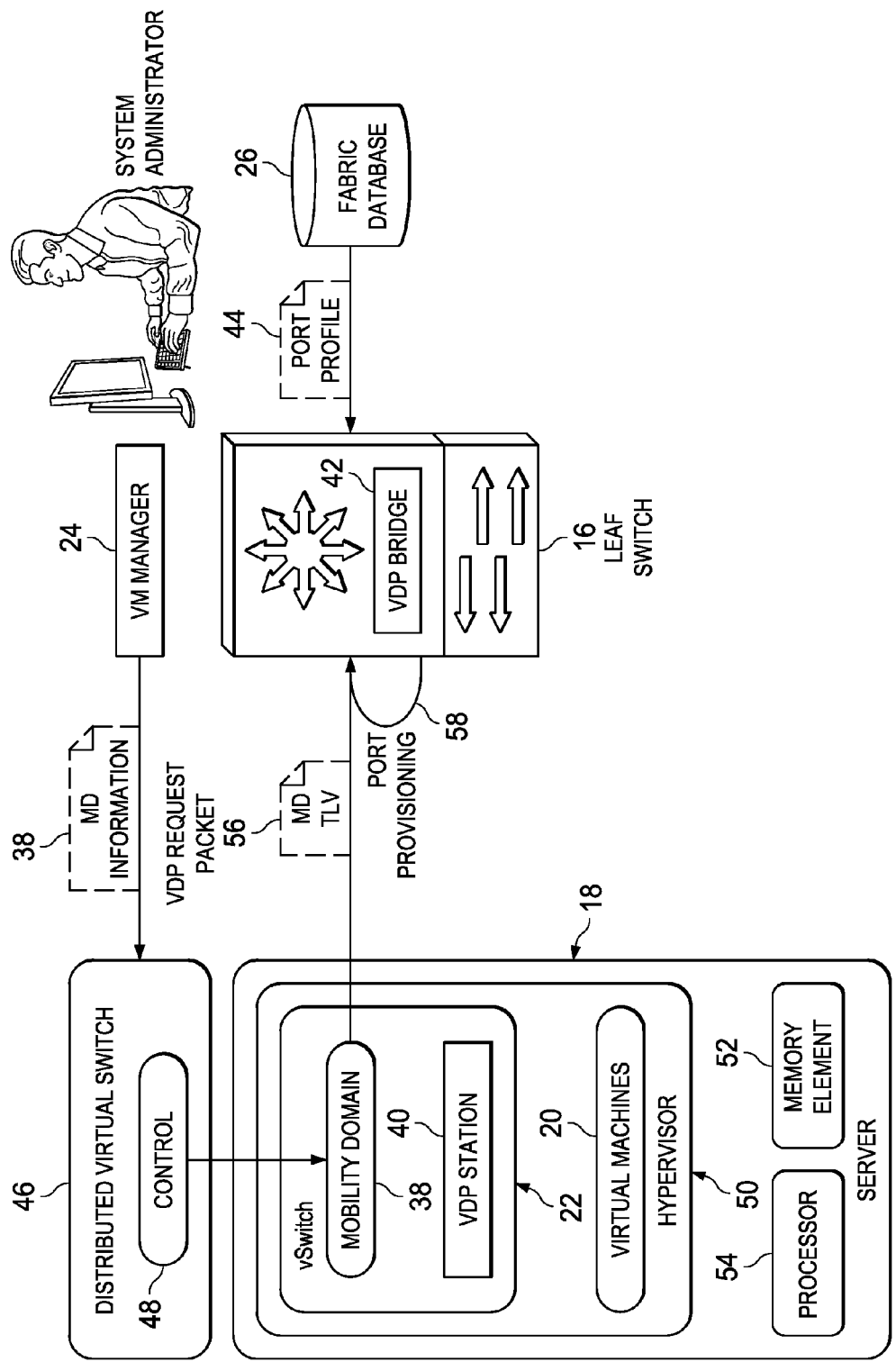
FIG. 2 is a simplified block diagram illustrating example details of an embodiment of the communication system.

Turning to FIG. 2, FIG. 2 is a simplified block diagram illustrating example details that may be associated with an embodiment of communication system 10. A system administrator (e.g., human operator) may configure VM manager 24 with mobility domain ID and VLANs for substantially all VMs 20 instantiated in network 12. VM Manager 24 may consulate the administrator provided information into MD information 38 and communicate it to a distributed virtual switch (DVS) 46. A control module 48 in DVS 46 may provide MD information 38 to vSwitch 22 instantiated in a hypervisor 50 in server 18. Server 18 may include a memory element 52 and a processor 54 for facilitating the vSwitch operations described herein.

VDP Station 40 executing in hypervisor 50 (or vSwitch 22) may receive MD information 38 and forward it to VDP Bridge 42 executing in directly connected leaf switch 16. MD information 38 may be conveyed in a MD TLV VDP request packet 56. In some embodiments, MD TLV VDP Request packet 56 may comprise a VDP associate request message. VDP Bridge 42 may extract the mobility domain ID and VLAN from MD TLV VDP request packet 56. Leaf switch 16 may query fabric database 26 for port profile 44 for the {mobility domain ID and VLAN} combination. Fabric database 26 may retrieve port profile 44 and provide it to leaf switch 16. Leaf switch 16 may perform port provisioning 58 on its port connected to server 18 (and over which MD TLV VDP Request packet 56 was received). Subsequently, packets destined to the {mobility domain ID, VLAN} combination may be forwarded by leaf switch 16 through the port appropriately.

Figure 3:
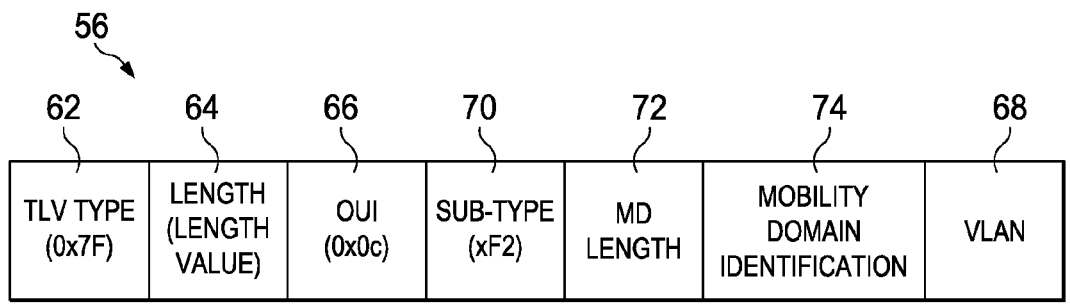
FIG. 3 is a simplified block diagram illustrating other example details of an embodiment of the communication system.

Turning to FIG. 3, FIG. 3 is a simplified diagram illustrating example details of MD TLV VDP request message 56 format according to an embodiment of communication system 10. The TLVs in MD TLV VDP request message 56 includes filter formats that indicate the network information parameters for a specific VM 20. Various blocks of bytes counting from the start of the message pertains to different information. Some of the blocks are pre-defined according to standard IEEE 802.1 qbg specifications. For example, TLV 0x7F block 62, Length block 64, OUI 0x0c block 66, and VLAN block 68 are according to standard specifications (e.g., vSwitch 22 passes the IP address and VM name to leaf switch 16 using OUI TLV 66; VLAN ID is carried in VLAN block 68; etc.). Other blocks are introduced herein according to various embodiments of communication system 10 to carry MD information 38. For example, sub-type 0xF2 block 70 would indicate a mobility domain OUI TLV. The following blocks, namely MD length 72 and mobility domain ID 74 would indicate respectively, the length of the mobility domain string following, and the value of the mobility domain ID.

Figure 4:
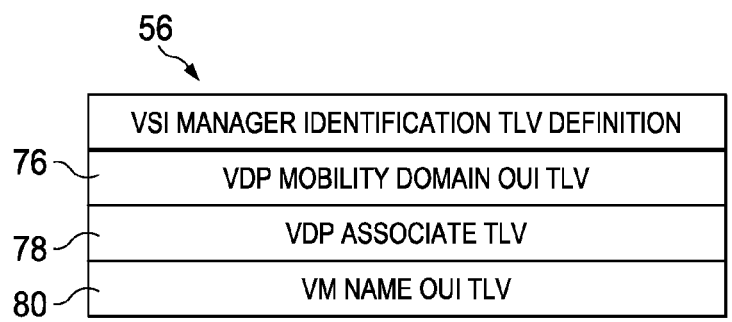
FIG. 4 is a simplified block diagram illustrating yet other example details of an embodiment of the communication system.

Turning to FIG. 4, FIG. 4 is a simplified diagram illustrating example details of MD TLV VDP request message 56 format according to an embodiment of communication system 10. The TLVs in MD TLV VDP request message 56 includes filter formats that indicate the VSI manager ID TLV definition. Some of the pre-defined blocks (e.g., according to standard IEEE 802.1 qbg specifications) may be modified to carry MD information 38. For example, the VSI manager ID according to IEEE standards identifies a VSI manager that holds the detailed VSI type and/or instance definitions; VSI manager ID can be used to obtain the IP address and/or other connectivity and access information for the VSI manager. Existing standards allow the VSI manager ID to carry VDP associate and VM name information. According to various embodiments, the VSI manager ID TLV definition can be modified to carry some mobility domain information, including at least three blocks of information: VDP mobility domain OUI TLV 76, VDP associate TLV 78, and VM name OUI TLV 80.

Figure 5:
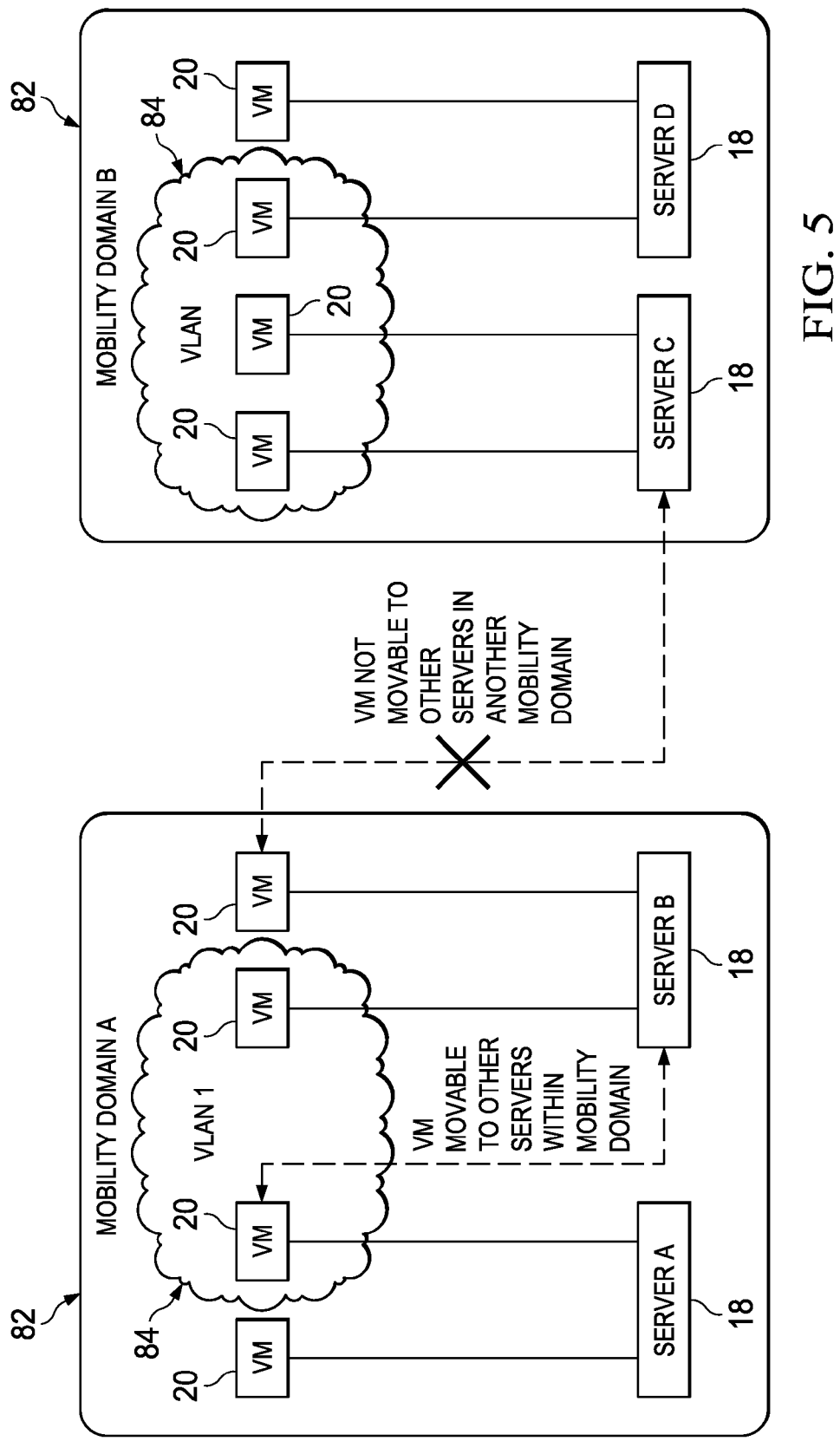
FIG. 5 is a simplified block diagram illustrating yet other example details of an embodiment of the communication system.

Turning to FIG. 5, FIG. 5 is a simplified block diagram illustrating example details of embodiments of communication system 10. Assume, merely for example purposes that network 12 includes two mobility domains 82, mobility domain A and mobility domain B. Mobility domain A may include servers A and B; mobility domain B may include servers C and D. VMs 20 in any mobility domain 82 (e.g., mobility domain A) may be migrated from one server 18 (e.g., server A) to another server 18 (e.g., server B) within the same mobility domain 82 (e.g., mobility domain A). However, VMs 20 in one mobility domain 82 (e.g., mobility domain A) may not be migrated to another server 18 (e.g., server C) in another mobility domain 82 (e.g., mobility domain B).

Moreover, each mobility domain 82 may include different VLANs 84; VLAN numbers may be the same across different mobility domains 82, although they may be unique within the mobility domain. For example, VLAN 1 may be configured in mobility domain A; another VLAN 1 may be configured in mobility domain B without any configuration conflicts. Thus, traffic from and to each VM 20 may be segregated according to the {mobility domain, VLAN} combination (e.g., {mobility domain A, VLAN1); {mobility domain B; VLAN 1} and so on) of the VM.

Figure 6:
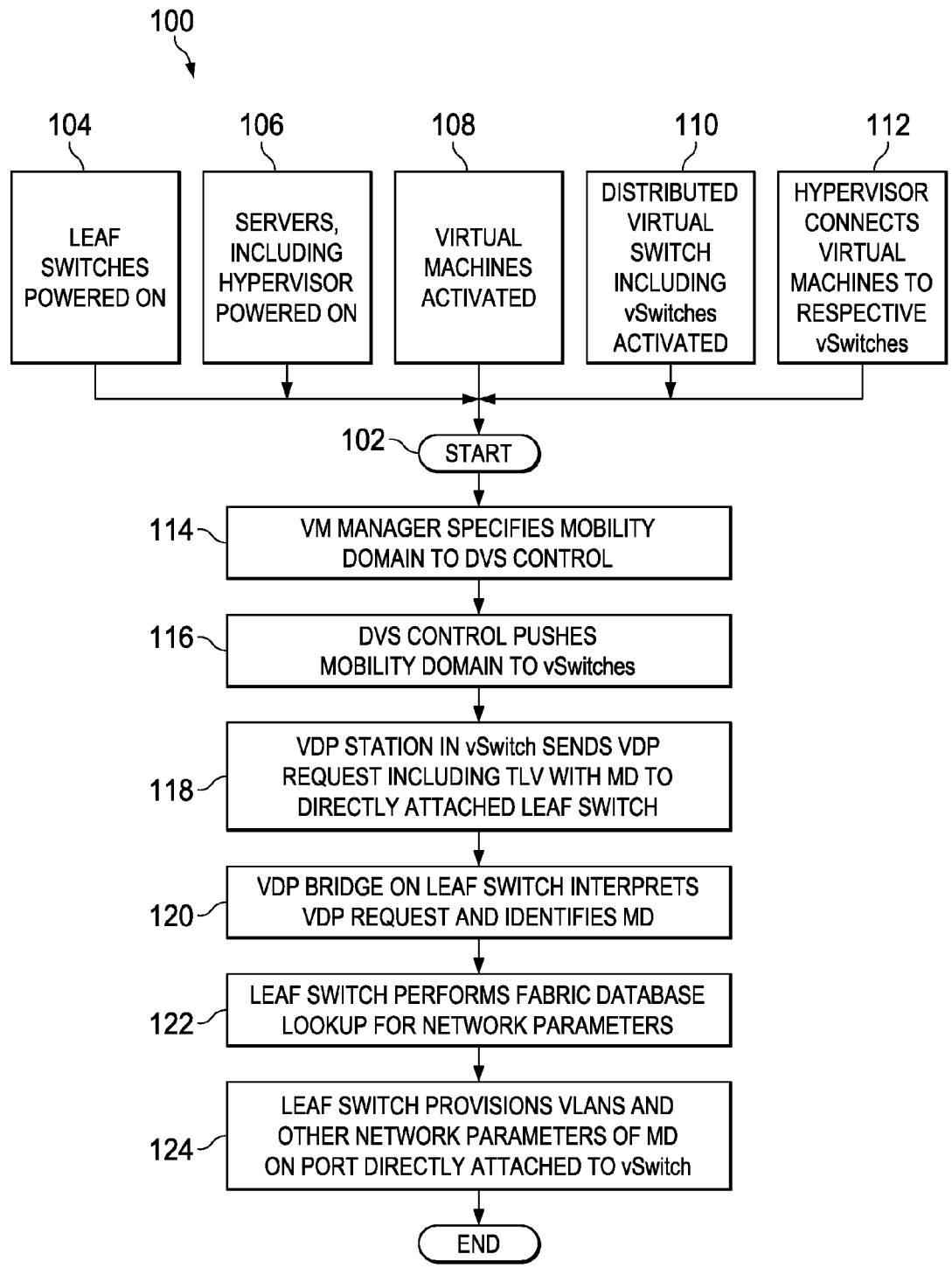
FIG. 6 is a simplified flow diagram illustrating example operations that may be associated with an embodiment of the communication system.

Turning to FIG. 6, FIG. 6 is a simplified flow diagram illustrating example operations 100 that may be associated with embodiments of communication system 10. At 102, communication system 10 may be activated for operations 100. The activation steps may include, at 102, powering on leaf switches 16; at 104, powering on servers 18 (including respective hypervisors); at 108, activating VMs 20; at 110, activated DVS 46, including vSwitches 22; at 112, respective hypervisors connecting VMs 20 to corresponding vSwitches 22.

At 114, VM manager 24 may specify MD information 38 to DVS control 48. At 116, DVS control 48 may push MD information 38 to vSwitches 22. At 118, VDP station 40 in each vSwitch 22 may send MD TLV VDP request message 56 to directly attached respective leaf switches 16. At 120, VDP Bridge 42 in respective leaf switches 16 interprets MD TLV VDP request message 56 and identifies corresponding mobility domains of directly attached VMs 20. At 122, leaf switches 16 may perform a lookup of fabric database 26 for network parameters associated with the mobility domains. At 124, respective leaf switches 16 may provision VLANs and other network parameters of the mobility domains on the appropriate ports of leaf switches 16.

Figure 7:
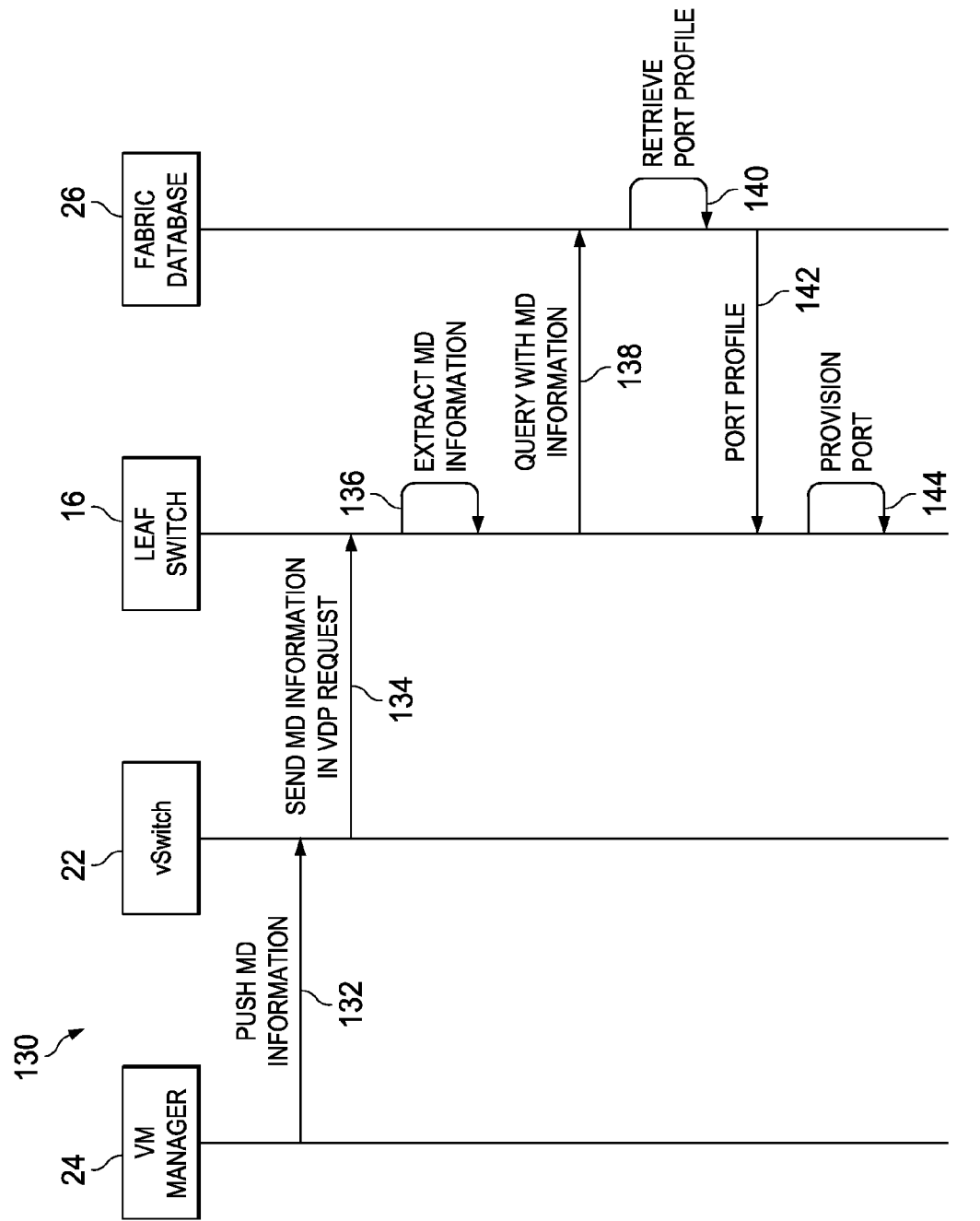
FIG. 7 is a simplified sequence diagram illustrating other example operations that may be associated with an embodiment of the communication system.

Turning to FIG. 7, FIG. 7 is a simplified sequence diagram illustrating example operations 130 that may be associated with embodiments of communication system 10. At 132, VM manager 24 may push MD information 38 to vSwitch 22. At 134, vSwitch 22 may send MD information in MD TLV VDP request message 56 to directly attached leaf switch 16. At 136, leaf switch 16 may extract MD information 38. At 138, leaf switch 16 may query fabric database 26 with MD information 38. At 140, fabric database 26 may retrieve port profile 44 associated with MD information 38. At 142, fabric database 26 may respond to leaf switch 16 with port profile 44. At 144, leaf switch 16 may provision appropriate port(s) according to port profile 44.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, DVS 46 (including vSwitch 22). In some embodiments, one or more of these features may be implemented in hardware, provided external to these elements, or consolidated in any appropriate manner to achieve the intended functionality. The various network elements (e.g., DVS 46, VM manager 24, leaf switches 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, DVS 46 (including vSwitch 22) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 52) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 54) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a hardware processor of a server in a network environment, comprising:
    receiving mobility domain information for a virtual machine associated with the processor, the mobility domain information comprising a mobility domain identifier (ID) of a mobility domain in the network, wherein the mobility domain indicates a scope of the network within which the virtual machine is to be moved between servers, wherein the virtual machine cannot be moved between two distinct mobility domains in the network, wherein any one virtual local area network (VLAN) spans multiple mobility domains, wherein the mobility domain includes more than one VLAN;
    generating a virtual station interface (VSI) discovery protocol (VDP) message in a type-length-value (TLV) format with the mobility domain information; and
    transmitting the VDP message to a leaf switch directly attached to the server, wherein the leaf switch provisions a port according to the mobility domain information.

2. The method of claim 1, wherein the mobility domain information further comprises virtual local area network (VLAN) information of the virtual machine, wherein the leaf switch queries a fabric database to obtain a port profile indexed at the fabric database according to a {mobility domain ID, VLAN} combination, wherein the leaf switch provisions the port according to the port profile.

3. The method of claim 1, wherein the VDP message is received at the leaf switch over the port.

4. The method of claim 1, wherein the server includes an instance of a virtual switch (vSwitch) comprising a portion of a distributed virtual switch (DVS) executing at a hypervisor in the server, wherein a VDP station in the hypervisor associated with the vSwitch generates the VDP message and transmits the VDP message to a corresponding VDP bridge executing in the leaf switch.

5. The method of claim 4, wherein the mobility domain ID comprises a universally unique identifier (UUID) of the vSwitch.

6. The method of claim 1, wherein the mobility domain information is received at the server from a central management application.

7. The method of claim 1, wherein the TLV format includes a sub-type indicating that the VDP message includes the mobility domain information, a mobility domain length indicating a length of the mobility domain ID, and a value indicating the mobility domain ID.

8. The method of claim 1, wherein a VSI manager ID TLV definition in the VDP message includes a mobility domain organizationally unique identifier (OUI).

9. The method of claim 1, further comprising transmitting periodic Keep Alive messages to the leaf switch including the mobility domain ID.

10. The method of claim 1, wherein the VDP message comprises a VDP associate message.

11. Non-transitory tangible media that includes instructions for execution, which when executed by a processor, is operable to perform operations comprising:
receiving mobility domain information for a virtual machine associated with the processor, the mobility domain information comprising a mobility domain ID of a mobility domain in the network, wherein the mobility domain indicates a scope of the network within which the virtual machine is to be moved between servers, wherein the virtual machine cannot be moved between two distinct mobility domains in the network, wherein any one virtual local area network (VLAN) spans multiple mobility domains, wherein the mobility domain includes more than one VLAN;
generating a virtual station interface (VSI) discovery protocol (VDP) in a TLV format with the mobility domain information; and
transmitting the VDP message to a leaf switch directly attached to the server, wherein the leaf switch provisions a port according to the mobility domain information.

12. The media of claim 11, wherein the mobility domain information further comprises VLAN information of the virtual machine, wherein the leaf switch queries a fabric database to obtain a port profile indexed at the fabric database according to a {mobility domain ID, VLAN} combination, wherein the leaf switch provisions the port according to the port profile.

13. The media of claim 11, wherein the mobility domain information is received at the server from a central management application.

14. The media of claim 11, wherein the TLV format includes a sub-type indicating that the VDP message includes the mobility domain information, a mobility domain length indicating a length of the mobility domain ID, and a value indicating the mobility domain ID.

15. The media of claim 11, wherein the server includes an instance of a virtual switch (vSwitch) comprising a portion of a DVS executing at a hypervisor in the server, wherein a VDP station in the hypervisor associated with the vSwitch generates the VDP message and transmits the VDP message to a corresponding VDP bridge executing in the leaf switch.

16. An apparatus, comprising:
a memory element for storing data;
and a processor, wherein the processor executes instructions associated with the data, wherein the processor and the memory element cooperate, such that the apparatus is configured for:
receiving mobility domain information for a virtual machine associated with the processor, the mobility domain information comprising a mobility domain ID of a mobility domain in the network, wherein the mobility domain indicates a scope of the network within which the virtual machine is to be moved between servers, wherein the virtual machine cannot be moved between two distinct mobility domains in the network, wherein any one virtual local area network (VLAN) spans multiple mobility domains, wherein the mobility domain includes more than one VLAN;
generating a virtual station interface (VSI) discovery protocol (VDP) in a TLV format with the mobility domain information; and
transmitting the VDP message to a leaf switch directly attached to the server, wherein the leaf switch provisions a port according to the mobility domain information.

17. The apparatus of claim 16, wherein the mobility domain information further comprises VLAN information of the virtual machine, wherein the leaf switch queries a fabric database to obtain a port profile indexed at the fabric database according to a {mobility domain ID, VLAN} combination, wherein the leaf switch provisions the port according to the port profile.

18. The apparatus of claim 16, wherein the mobility domain information is received at the server from a central management application.

19. The apparatus of claim 16, wherein the TLV format includes a sub-type indicating that the VDP message includes the mobility domain information, a mobility domain length indicating a length of the mobility domain ID, and a value indicating the mobility domain ID.

20. The apparatus of claim 16, wherein the server includes an instance of a virtual switch (vSwitch) comprising a portion of a DVS executing at a hypervisor in the server, wherein a VDP station in the hypervisor associated with the vSwitch generates the VDP message and transmits the VDP message to a corresponding VDP bridge executing in the leaf switch.

* * * * *